United States Patent [19]

Aritomi et al.

[11] Patent Number: 4,654,178

[45] Date of Patent: Mar. 31, 1987

[54] PROCESS FOR PRODUCTION OF HIGHLY RIGID SHAPED PRODUCT OF POLYMER CONTAINING THEREIN DIACETYLENE GROUP

[75] Inventors: Mitsutoshi Aritomi; Eisuke Fujiwara, both of Ibaraki, Japan

[73] Assignee: Agency of Industrial Science and Technology, Tokyo, Japan

[21] Appl. No.: 818,744

[22] Filed: Jan. 14, 1986

[30] Foreign Application Priority Data

Feb. 1, 1985 [JP] Japan .................................. 60-17737
Sep. 30, 1985 [JP] Japan .................................. 60-214702

[51] Int. Cl.$^4$ ............................................. B29C 43/02
[52] U.S. Cl. .................................... 264/102; 264/123; 264/126; 264/319; 264/331.16; 526/285
[58] Field of Search ............... 264/109, 123, 126, 319, 264/320, 322, 331.16, 102; 425/77; 526/285

[56] References Cited

U.S. PATENT DOCUMENTS

| | | | |
|---|---|---|---|
| 3,923,622 | 12/1975 | Baughman | 526/285 |
| 4,014,965 | 3/1977 | Stube et al. | 264/322 |
| 4,220,747 | 9/1980 | Preziosi | 526/285 |
| 4,339,951 | 7/1982 | Yee et al. | 204/157.61 |
| 4,439,346 | 3/1984 | Gordhanbhai et al. | 526/285 |

Primary Examiner—James Lowe
Attorney, Agent, or Firm—Oblon, Fisher, Spivak, McClelland & Maier

[57] ABSTRACT

A method for producing polyurethane or polyester containing therein the diacetylene group having high rigidity and useful in manufacturing precision mechanical parts, which comprises molding a polymer material containing therein the diacetylene group having a unit structure to be represented by the following general formula and a molecular weight in a range from $5 \times 10^2$ to $1 \times 10^5$ under a high pressure and at a temperature below the melting point of the polymer:

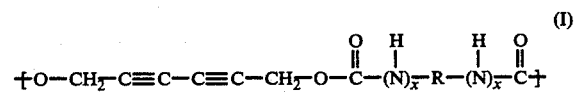

wherein R is a divalent organic group; and x is an integer of 0 or 1.

7 Claims, 1 Drawing Figure

PROCESS FOR PRODUCTION OF HIGHLY RIGID SHAPED PRODUCT OF POLYMER CONTAINING THEREIN DIACETYLENE GROUP

BACKGROUND OF THE INVENTION

1. Field of the Invention

This invention relates to a process for producing a shaped product of polyurethane or polyester having high rigidity and containing therein a diacetylene group, the shaped product being useful as precision mechanical parts such as gears, cams, and so forth.

2. Description of the Prior Art

It has been well known that certain diacetylene compounds in their crystalline state are polymerized by heat or high energy rays such as $\gamma$-rays, ultraviolet rays, and so on (topochemical polymerization).

However, there have so far been very small number of research reports on polyurethane or polyester containing therein a diacetylene group (e.g., Makromo. Chem., 134, 219–229 (1970); Arm. Khim. Zh., 23(11), 1004–1009 (1970); U.S. Pat. No. 3,709,860, etc.; Journal of Polymer Science, Polym. Chem. Ed., Vol. 19, 1154 (1981)). These research reports are mostly concerned with formation of coating film of polyurethane or polyester containing therein the diacetylene group through the photopolymerization thereof, in which no attempt is made as to obtaining the highly rigid and thick shaped product of such polymer material by molding the same into desired forms.

SUMMARY OF THE INVENTION

The present inventors conducted various studies and researches to make much use of the characteristic properties of diacetylene structure, in particular its high reactivity, as the result of which they succeeded in obtaining highly rigid shaped product of a polymer containing therein the diacetylene structure by shaping the polymer material in its solid phase state at a temperature below the melting point thereof and under a high pressure condition, based on which they arrived at the present invention.

It is therefore the primary object of the present invention to provide a highly rigid shaped product of polyurethane or polyester containing therein the diacetylene group and which is useful in manufacturing the precision mechanical parts such as gears, cams, and so forth.

According to the present invention in general aspect of it, there is provided a method for production of a highly rigid shaped product of a polymer containing therein diacetylene group, said method being characterized in that a polymer containing therein the diacetylene group having a molecular weight range of from $5 \times 10^2$ to $1 \times 10^5$ and containing therein a unit to be represented by the following general formula I is subjected to molding operation under a high pressure and at a temperature not reaching the melting point of said polymer:

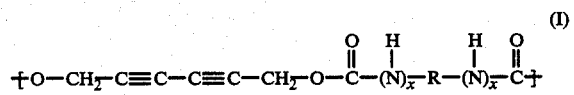
(I)

wherein R represents a divalent organic group; and x is an integer of 0 or 1.

The foregoing object, other objects, advantages, and features of the present invention will become more readily apparent from consideration of the following detailed description thereof, when it is read in conjunction with several preferred examples to practice the invention as well as the accompanying drawing.

BRIEF DESCRIPTION OF THE DRAWING

In the drawing,
the single

DETAILED DESCRIPTION OF THE INVENTION

Figure 1:
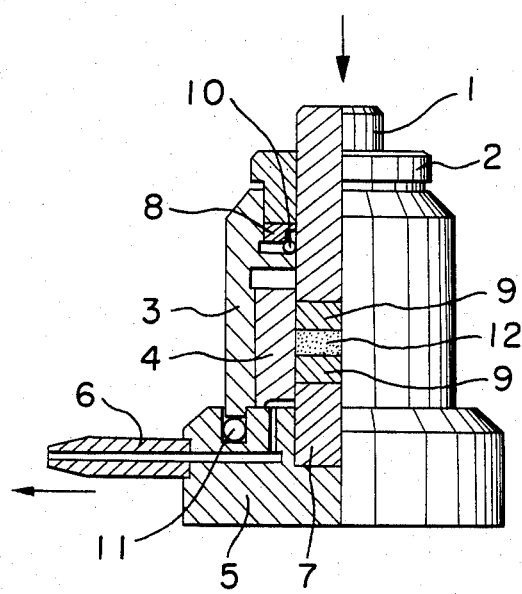
FIG. 1 is a longitudinal cross-sectional view, at the left part, of a molding apparatus to be used for the present invention.

The polymer containing therein the diacetylene group to be used for the present invention is such one having its molecular weight ranging from $5 \times 10^2$ to $1 \times 10^5$ and containing therein a unit structure represented by the following general formula I:

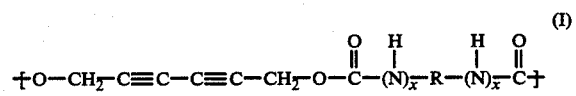
(I)

wherein R represents a divalent organic group; and x represents an integer of 0 or 1.

More particularly, such polymer is any one of the following polymer compounds:

(a) Polyurethane containing therein the diacetylene group with its molecular weight in a range of from $1 \times 10^3$ to $1 \times 10^5$ and having a unit structure to be represented by the following general formula II:

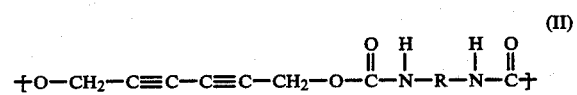
(II)

wherein R represents a residual group of diisocyanate having carbon atoms of from 2 to 20, and from which NCO has been removed.

(b) Polyester containing therein the diacetylene group with its molecular weight in a range of from $5 \times 10^2$ to $1 \times 10^5$ and having a unit structure to be represented by the following general formula III:

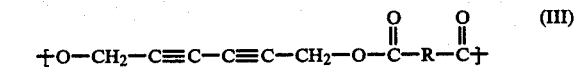
(III)

wherein R represents a residual group of a dicarboxylic acid compound having carbon atoms of from 2 to 30, and from which the carboxylic group has been removed.

As the starting materials for the present invention, the polyurethane containing therein the diacetylene group represented by the above formula II may be synthesized in accordance with the ordinary process, wherein organic diisocyanate and 2,4-hexadiene-1,6-diol (as the diacetylene-group-containing-diol) are subjected to the addition reaction.

For the organic diisocyanate, there may be used hexamethylene diisocyanate (HMDI), isophorone diisocyanate (IPDI), 4,4'-diphenylmethane diisocyanate (MDI), 2,4-tolylene diisocyanate (2,4-TDI), 2,6-tolylene diisocyanate (2,6-TDI), metaxylylene diisocyanate (XDI), 1,5-naphthalene diisocyanate, 4,4'-dicyclohexylmethane diisocyanate (hydrogenated MDI), and others as well as a mixture of any of these. Incidentally, 2,4-hexadiene- 1,6-diol as a comonomer may be synthesized by the oxidation coupling of propargyl alcohol through the ordinary process.

The synthesis of polyurethane by the poly-addition reaction of diisocyanate and diol may be done by the ordinary process for the production of polyurethane as described in any technical reference books of polyurethane synthesis such as "Lectures on Plastic Material [2]—Polyurethane Resin" published by Nikkan Kogyo Shinbunsha, Japan, or others.

While there is no particular limitation to the molecular weight of polyurethane containing therein the diacetylene group, it ranges generally between $1 \times 10^3$ and $1 \times 10^5$. Further, there is no limitation to the form of polyurethane containing therein the diacetylene group, but it is preferably used in its powder form.

Polyester containing therein the diacetylene group as represented in the above formula III for the starting material to be used for the purpose of the present invention can be synthesized in accordance with the ordinary process, wherein dicarboxylic acid or its acid chloride and 2,4-hexadiene-1,6-diol (which is the diol having therein the diacetylene group) are subjected to the polycondensation reaction.

The synthesis of polyester through the polycondensation reaction of dicarboxylic acid or its acid chloride and diol may be attained by the ordinary process for the production of polyester as described in any technical reference books on polyester synthesis such as "Lectures—Theory on Polymerization Reaction, Vol. 9, Polycondensation" published by Kagaku Doji Sha, Japan, or others.

For the carboxylic acid, there may be used terephthalic acid, isophthalic acid, ortho-phthalic acid, biphenyl dicarboxylic acid, 4,4-oxydibenzoic acid, 2,6-naphthalene dicarboxylic acid, and other aromatic dicarboxylic acids as well as their acid chlorides or their nucleus substituents; hexahydrophthalic acid, tetrahydrophthalic acid, endomethylene tetrahydrophthalic acid, and other alicyclic dicarboxylic acids as well as their acid chlorides; and succinic acid, adipic acid, sebacic acid, and other aliphthalic dicarboxylic acids or their acid chlorides. A mixture of these substances may also be used. Incidentally, 2,4-hexadiene-1,6-diol as a comonomer may be synthesized by the ordinary process through the oxidation coupling of propargyl alcohol.

While there is no particular limitation to the molecular weight of polyester containing therein the diacetylene group, it generally ranges between $5 \times 10^2$ and $1 \times 10^5$. Also, there is no restriction to the form of the polyester containing therein the diacetylene group, but it is preferably used in its powder form.

The characteristic feature of the method for producing the highly rigid shaped product of polyurethane or polyester containing therein the diacetylene group according to the present invention resides in that such polymer material is molded in its solid phase state and under a high pressure.

As the high pressure molding method, there may be adopted the hydrostatic pressure application and other pressure applying methods. There is no particular upper limit to the pressure to be applied, provided it is higher than 500 atmosphere. A preferred range of the pressure is from 1,000 atm. to 10,000 atm. While the molding can be achieved under the atmospheric pressure, it should still preferably be achieved under a reduced pressure condition (500 mmHg or below) or the vacuum condition by purging air in the pressure applying vessel and the voids in the specimen so as to obtain the shaped product having no voids therewithin. FIG. 1 of the accompanying drawing illustrates one example of the molding apparatus for that purpose. In the drawing, a reference numeral 1 designates a push rod; a numeral 2 refers to a pressing metal; 3 an outer barrel; 4 an inner barrel; 5 a base stand; 6 an air discharging tube; 7 a receiving rod; 8 an O-ring fixing member; 9 a mirror surface plate; 10 an upper O-ring; 11 a lower O-ring; and 12 resin powder for molding.

There is no particular limitation to the temperature for the press-molding, provided that it is below the melting point of the polymer containing therein the diacetylene group. A preferred range of such molding temperature is from a room temperature (20° C.) to 200° C. for polyurethane containing therein the diacetylene group, or more preferably from 50° C. to 150° C. The reason for this is that, since the polymer undergoes the exothermic reaction at a temperature of from approximately 160° C. to 200° C., the molding should be carried out at a temperature lower than that. Further, a preferred range of the molding temperature for polyester containing therein the diacetylene group may be from a room temperature (20° C.) to 250° C., or more preferably from 50° C. to 200° C. The reason for this is that, since the polymer is decomposed at a temperature of from approximately 250° C. to 300° C., the molding should be carried out at a temperature lower than that.

The thus obtained highly rigid shaped product of the polymer containing therein the diacetylene group according to the present invention has its modulus of compression elasticity of 3 giga paschals (GPa) or higher with the result that it has an extremely high rigidity, excellent density, and high hardness.

Since the shaped product to be obtained by the practice of the present invention possesses excellent physical properties as mentioned above, and can be worked into any arbitrary shape by various machining processes such as cutting, grinding, etc., the material is very useful for manufacturing component parts of precision machines such as gears, cams, and so forth, which are required to have high degree of physical properties.

It is further possible that, at the time of the high pressure molding of the polymer containing therein the diacetylene group according to the present invention, various additives such as inorganic or organic fillers, pigments, ultraviolet absorbing agents, stabilizers, and so on be mixed with the polymer for molding.

In the following, preferred examples to put the present invention into practice will be presented, although these examples is not for limiting the scope of the present invention. By the way, the quantity of the ingredients in these examples is denoted by "weight part", unless otherwise specified.

Production of polyurethane containing therein diacetylene group:

REFERENCE EXAMPLE 1

In a four-necked flask of a 1-liter capacity equipped with an agitating device, a dripping funnel, a nitrogen feeding tube, and a thermometer, 33 parts (0.3 mole) of 2,4-hexadiene-1,6-diol was dried and then dissolved into 300 parts of N,N-dimethylformamide under the nitrogen current, to which 0.3 part of dilauric acid-di-n-butyltin and 0.5 part of triethylamine were added as the urethanating catalysts.

Subsequently, 50.5 parts (0.3 mole) of hexamethylene diisocyanate was added drop by drop into this flask, while the batch was being agitated, and the content was subjected to reaction for one hour. Following this, the batch was heated from outside to continue the reaction for three hours at 60° C.

After termination of the reaction, the reaction liquid was poured into 3,000 parts of methanol, while vigorously agitating the same, thereby re-settling polyurethane containing therein the diacetylene group. The resulted polyurethane in powder form was then filtered, further washed with 1,000 parts of methanol, and dried for about 100 hours under a reduced pressure condition.

The yielded quantity of the product was 83 parts. When this product was analysed by means of the IR spectrum and the NMR spectrum, it was verified to be the intended poly(oxycarbonyl iminohexamethylene iminocarbonyloxy-2,4-hexadiene) (hereinafter abbreviated as "Poly(HMDI/2,4-HD"). Furthermore, as the result of the molecular weight measurement by the gel permeation chromatograph (GPC), the number average molecular weight of the product was found to be $3.6 \times 10^4$ (in terms of the polystyrene conversion).

In the similar method and with varying kinds of diisocyanate, there was manufactured polyurethane containing therein the diacetylene group [poly(IPDI/2,4-HD)] from isophorone diisocyanate; poly(hydrogenated MDI/2,4-HD) from hydrogenated MDI; poly(MDI/2,4-HD) from MDI, poly(TDI/2,4-HD) from TDI, and poly(XDI/2,4-HD) from XDI.

REFERENCE EXAMPLE 2

In place of 2,4-hexadiene-1,6-diol used in Reference Example 1 above, use was made of 1,6-hexanediol to produce polyurethane not containing therein the acetylene group [poly(oxycarbonyl iminohexamethylene iminocarbonyloxyhexamethylene) abbreviated as "poly(HMDI/1,6-HDO)"].

Production of polyester containing therein the diacetylene group:

REFERENCE EXAMPLES 3 TO 5

In a four-necked flask of 1-liter capacity equipped with an agitating device, a dripping device, a nitrogen feeding tube, and a thermometer, 44 parts (0.4 mole) of 2,4-hexadiene-1,6-diol was dissolved into 400 parts of N,N-dimethylformamide under the nitrogen current, to which 66 parts (0.42 mole) of pyridine was added as an deoxidizer, and the solution was cooled to 10° C. or below.

Following this, 81.2 parts (0.4 mole) of isophthalic acid chloride was dissolved into 100 parts of N,N-dimethylformamide in such a manner that the former was added drop by drop into the flask, while agitating and maintaining the temperature at 10° C. or below to cause these two materials to react for one hour, followed by further reaction for three hours at a room temperature.

After termination of the reaction, the reaction liquid was poured into 3,000 parts of pure water with vigorous agitation, thereby re-settling polyester containing therein the diacetylene group. Then, the thus obtained polyester in powder form was filtered, washed with 1,000 parts of methanol, and dried for about 100 hours under a reduced pressure. The yielded quantity of the product was 97 parts. When this product was analyzed by the infrared ray absorption spectrum and the NMR spectrum, it was verified to be the intended poly(oxyhexamethylene-2,4-diene-oxyisophthaloyl) [hereinafter abbreviated as "PE(HD/i-PT)"]. Further, as the result of measuring its molecular weight by the gel permeation chromatograph (GPC), the product was found to have its number average molecular weight of 1,900 (in terms of the polystyrene conversion).

In the similar manner and with varying kinds of acid chloride, there was produced polyester containing therein the diacetylene (PE(HD/TP)) by use of terephthalic acid chloride; PE(HD/o-PT) by use of orthophthalic acid chloride; and PE(HD/Ad) by use of adipic acid chloride.

REFERENCE EXAMPLE 6

In place of 2,4-hexadiene-1,6-diol used in Reference Example 3 above, use was made of 1,6-hexanediol to produce polyester not containing therein the diacetylene group (PE(HDO/i-PT)).

EXAMPLE 1

0.7 part of polyurethane containing therein the diacetylene group (Poly(HMDI/2,4-HD)) produced in Reference Example 1 above was filled in the cylinder of the molding apparatus shown in FIG. 1, and then the air within the cylinder was purged by means of a vacuum pump.

The molding apparatus was then placed on a hydraulic press which had been pre-heated to 130° C., and the molding apparatus was subjected to pre-heating for five minutes. Subsequently, the press-molding operation was carried out under a pressure of 7,960 kg/cm² applied to the molding apparatus for 10 minutes, during which the pressure application was continued. The resulted shaped product was in the form of a circular disc in dark red having a thickness of approximately 2 mm and a diameter of 20 mm.

The thus obtained shaped product was then cut out into a parallelepiped having a height of 14 mm, a width of 13 mm and a thickness of 2 mm, which was made a test specimen. This specimen was subjected to a compression test by means of a compression tester "AUTOGRAPH DSS-500 Type" (a product of Shimadz Seisakusho, Japan) at a test speed of 0.5 mm/min. the modulus of compressive elasticity of this shaped product was 3.9 GPa and its compression strength was 98 MPa.

COMPARATIVE EXAMPLE 1

The polyurethane not containing therein the acetylene group (Poly(HMDI/1,6-HDO) as used in Reference Example 2 above was molded into a shaped article under the same conditions as in Example 1 above, and the resulted shaped product was subjected to the compression test. The modulus of compressive elasticity of this shaped product was 1.5 GPa, and its compression strength was as low as 29 MPa.

EXAMPLE 2

The pressure application time of the shaping conditions in Example 1 above was changed from 10 minutes to one hour, thereby obtaining the similar shaped product. This shaped product was subjected to the compression test. The modulus of compressive elasticity of this shaped product was 3.9 GPa and its compression strength was 88 MPa.

EXAMPLE 3

The pressure application time of the shaping conditions in Example 1 above was changed from 10 minutes to 4 hours. From the thus obtained shaped product, a test specimen having a height of 13 mm, a width of 10 mm, and a thickness of 1.8 mm was cut out, which was then subjected to the compression test. The modulus of compressive elasticity of this shaped product was 6.1 GPa and its compression strength was 99 MPa.

EXAMPLE 4

In place of poly(HMDI/2,4-HD) used in Example 1 above, use was made of Poly(MDI/2,4-HD) to produce a shaped product under a pressure of 7,960 kg/cm$^2$ which was applied for consecutive two hours, whereupon there was obtained a shaped product similar to that obtained in Example 1 above. When the thus obtained shaped product was subjected to the compression test, its modulus of compressive elasticity was found to be 4.8 GPa and its compression strength to be 120 MPa.

EXAMPLES 5 AND 6

In place of Poly(HMDI/2,4-HD) used in Example 1 above, use was made of Poly(IPDI/2,4-HD) and Poly(-hydrogenated MFI/2,4-HD) to carry out the molding to thereby obtain similar shaped products.

EXAMPLE 7

Poly(HMDI/2,4-HD) used in Example 1 above was molded into a shaped product by placing the material into a push-in metal mold, pre-heating the metal mold at a pre-heating temperature of 130° C. for five minutes, and pressing the material for 10 minutes at a pressure of 4,590 kg/cm$^2$, from which a shaped product having a thickness of 4 mm, a width of 12.7 mm, and a length of 60 mm was obtained. When this shaped product was subjected to the bending test at a testing speed of 1 mm/min, it was found to have the modulus of bending elasticity of 3.3 GPa and the bending strength of 0.99 GPa.

EXAMPLE 8

0.7 part of polyester containing therein the diacetylene group (PE(HD/i-PT)) produced in Reference Example 3 was filled in the cylinder of the molding apparatus shown in FIG. 1, and then the air within the cylinder was purged by means of a vacuum pump.

The molding apparatus was then placed on a hydraulic press which had been pre-heated to 130° C., and then the molding apparatus was subjected to pre-heating for five minutes, as it was. Subsequently, the press-molding operation was conducted under a pressure of 7,960 kg/cm$^2$ applied to the molding apparatus for 10 minutes, during which the pressure application was continued. The thus obtained shaped product was in the form of a circular disc in black having a thickness of approximately 2 mm and a diameter of 20 mm.

The thus obtained shaped product was then cut out into a parallelepiped having a height of 14 mm, a width of 13 mm, and a thickness of 2 mm, which was made a test specimen. This test specimen was subjected to a compression test by means of a compression tester "AUTOGRAPH DSS-500 Type" (a product of Shimadz Seisakusho, Japan) at a test speed of 0.5 mm/min. The modulus of compressive elasticity of this shaped product was 4.7 GPa and its compression strength was 0.117 GPa.

COMPARATIVE EXAMPLE 2

Attempt was made as to molding polyester not containing therein the diacetylene group (PE(HDO/i-PT)) as produced in Reference Example 8 above under the same conditions as in Example 8 above. No shaped product could be successfully obtained, since the glass transition point (Tg) of this polymer was lower than a room temperature.

EXAMPLE 9

The pressure application time of the shaping conditions in Example 8 above was changed from 10 minutes to 60 minutes, thereby obtaining a shaped product in black similar to that obtained in Example 8 above. When this shaped product was subjected to the same compression test, the modulus of compressive elasticity was found to be 5.6 GPa and its compression strength was 0.109 GPa.

EXAMPLES 10 TO 11

PE(HD/i-PT) in Example 8 above was replaced by PE(HD/TP), with which a shaped product was obtained under applied pressure of 7,960 kg/cm$^2$, pressure applying time of 30 min. and 60 min., respectively, and compression temperature of 130° C.

As the results of this, there could be obtained the shaped product in black, which was similar to that in Example 8 above. When this black test specimen was subjected to the similar compression tests, the modulus of compressive elasticity thereof was 4.2 GPa and 5.1 GPa, respectively, while its compression strength was 0.075 GPa and 0.075 GPa.

EXAMPLE 12

PE(HD/i-PT) as used in Example 8 above was replaced with PE(HD/o-PT). Then, the starting material was shaped into a desired shape under the pressure of 7,960 kg/cm$^2$ for continued time of 10 minutes and at a temperature of 65° C. As the result of this, there could be obtained the black shaped product same as that in Example 1. When the shaped article was subjected to the compression test similar to those in the previous examples, its modulus of compressive elasticity was 4.1 GPa, and its compression strength was 0.085 GPa.

What is claimed is:

1. A method for producing a highly rigid shaped product of polymer containing therein a diacetylene group, which comprises molding a polymer containing therein the diacetylene group having a unit structure to be represented by the following general formula I and a molecular weight in a range of from $5 \times 10^2$ to $1 \times 10^5$ under a high pressure and at a temperature below the melting point of said polymer:

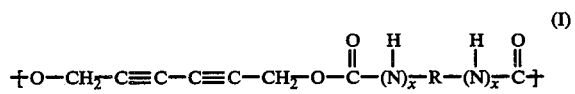

(I)

wherein R is a divalent organic group; and x is an integer of 0 or 1.

2. A method for producing a highly rigid shaped product of polymer containing therein the diacetylene group according to claim 1, wherein said diacetylene group containing polymer is polyurethane containing therein the diacetylene group having therein a unit structure to be represented by the following general formula II and a molecular weight in a range of from $1 \times 10^3$ to $1 \times 10^5$

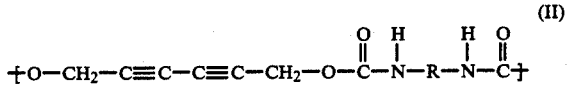

(II)

wherein R is a residual group of diisocyanate having carbon atoms of from 2 to 20 after removel of NCO therefrom.

3. A method for producing a highly rigid shaped product of polymer containing therein the diacetylene group according to claim 1, wherein said diacetylene group containing polymer is a polyester containing therein the diacetylene group having a unit structure to be represented by the following general formula III and a molecular weight in a range of from $5 \times 10^2$ to $1 \times 10^5$:

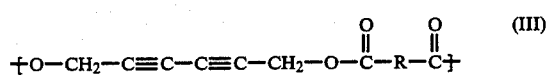

(III)

wherein R is a residual group of a dicarboxylic acid compound having carbon atoms of from 2 to 30 after removal of carboxylic group therefrom.

4. A method for producing a highly rigid shaped product of polymer containing therein the diacetylene group according to claim 1, wherein the diacetylene group containing polymer is molded in its solid phase state under a high pressure of 500 atmosphere or higher and at a temperature in a range of from a room temperature to 200° C.

5. A method for producing a highly rigid shaped product of polymer containing therein the diacetylene group according to claim 1, wherein the molding operation is carried out under a pressure in a range of from 500 atm. to 10,000 atm. and at a temperature in a range of from 20° C. to 200° C.

6. A method for producing a highly rigid shaped product of polymer containing therein the diacetylene group according to claim 1, wherein the molding operation is carried out under a reduced pressure.

7. A method for producing a highly rigid shaped product of polymer containing therein the diacetylene group according to claim 1, wherein the modulus of compressive elasticity of the shaped product is in a range of from 3 to 7 giga paschals (GPa).

* * * * *